(12) United States Patent
Shim et al.

(10) Patent No.: US 9,882,461 B2
(45) Date of Patent: Jan. 30, 2018

(54) STEP MOTOR AND SYSTEM FOR DRIVING STEP MOTOR

(71) Applicant: Samsung Electronics Co., Ltd., Suwon-si (KR)

(72) Inventors: Jae-kyu Shim, Suwon-si (KR); Woo-jong Cho, Suwon-si (KR); Bon-min Koo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 14/848,110

(22) Filed: Sep. 8, 2015

(65) Prior Publication Data

US 2016/0079839 A1 Mar. 17, 2016

(30) Foreign Application Priority Data

Sep. 15, 2014 (KR) .................. 10-2014-0122034

(51) Int. Cl.
| | | |
|---|---|---|
| H02K 23/66 | (2006.01) | |
| H02K 37/10 | (2006.01) | |
| H02K 37/14 | (2006.01) | |
| H02K 11/00 | (2016.01) | |
| H02K 1/27 | (2006.01) | |
| H02K 3/28 | (2006.01) | |
| H02P 8/12 | (2006.01) | |

(52) U.S. Cl.
CPC .............. *H02K 37/10* (2013.01); *H02K 1/27* (2013.01); *H02K 3/28* (2013.01); *H02K 11/0094* (2013.01); *H02K 37/14* (2013.01); *H02P 8/12* (2013.01)

(58) Field of Classification Search
CPC ....... H02K 37/14; H02K 11/00; H02K 11/225

USPC ....................................... 310/68 B
See application file for complete search history.

(56) References Cited

U.S. PATENT DOCUMENTS

| | | | | |
|---|---|---|---|---|
| 4,418,347 A | * | 11/1983 | Tanaka ................. | G01D 5/2415 324/660 |
| 4,782,255 A | * | 11/1988 | Oosaka ................ | G11B 5/5521 310/156.08 |
| 2006/0144166 A1 | * | 7/2006 | Ruehl ................... | G01L 3/105 73/862.331 |

(Continued)

FOREIGN PATENT DOCUMENTS

| | | |
|---|---|---|
| JP | 57080518 A | 5/1982 |
| KR | 20150032117 A | 3/2015 |

OTHER PUBLICATIONS

European Search Report dated Jun. 2, 2016 in connection with European Patent Application No. EP 15 18 5180.

*Primary Examiner* — Bickey Dhakal

(57) ABSTRACT

A step motor includes a plurality of stator cores. Each of the stator cores have a coil unit coiled therearound. The step motor includes a rotor that includes a rotation shaft and a plurality of permanent magnets and is configured to rotate by magnetic interaction between the stator cores and the permanent magnets. The step motor also includes a plurality of conducting parts on one cross-sectional surface of the rotor. The step motor further includes a printed circuit board (PCB) including electric elements that are arranged at certain positions and are disposed to face the conducting parts. The conducting parts and the electric elements are configured to electrically or magnetically interact as the rotor rotates to change electrical signals generated by the electric elements.

13 Claims, 12 Drawing Sheets

(56) References Cited

U.S. PATENT DOCUMENTS

| | | | |
|---|---|---|---|
| 2010/0127585 A1* | 5/2010 | Fee | H02K 11/40 |
| | | | 310/71 |
| 2012/0007592 A1* | 1/2012 | Manabe | G01D 5/2073 |
| | | | 324/207.25 |
| 2012/0025851 A1 | 2/2012 | Homeijer et al. | |
| 2015/0077033 A1 | 3/2015 | Lee et al. | |

* cited by examiner

STEP MOTOR AND SYSTEM FOR DRIVING STEP MOTOR

CROSS-REFERENCE TO RELATED APPLICATION(S) AND CLAIM OF PRIORITY

The present application is related to and claims the benefit of Korean Patent Application No. 10-2014-0122034, filed on Sep. 15, 2014, in the Korean Intellectual Property Office, the disclosure of which is incorporated herein in its entirety by reference.

TECHNICAL FIELD

The present disclosure relates to a step motor and a system for driving a step motor.

BACKGROUND

Step motors are a driving device that may control a rotation angle of a motor to be constant by using a simple controlling circuit which may accurately control a location of a subject of the driving without including a separate location sensor.

A step motor of the related art is driven by using a basic angle control scheme, which is referred to as a full step or half step control mode. When the step motor is controlled by using the basic angle control scheme, a shaft may vibrate as a motor rotates to a basic movement angle at a relatively large angle for every pulse input. The micro step control scheme is a technique that controls a step motor by increasing resolution of a rotation angle in a method of driving a step motor by dividing a step into angles (a micro step) smaller than the basic movement angle to drive a step motor. According to the micro step control, a decrease in a rotation angle of a motor per step may reduce shaft vibration and increase the resolution of the motor rotation angle. However, even when the micro step driving method is used, a location error of about ±5% may occur in general.

In order to compensate for the error, a magnetic sensor or an optical sensor that may sense a location of a rotator may be placed in a step motor, and thus a location error caused by driving a step motor may be sensed and compensated for. However, when a magnetic sensor or an optical sensor is placed in a step motor, a size of a driving unit may increase according to an external diameter of the sensor, and it may be difficult to place a microscopic sensor on a printed circuit board (PCB).

SUMMARY

To address the above-discussed deficiencies, it is a primary object to provide for use a step motor.

Provided is a step motor and a system for driving a step motor. Additional aspects will be set forth in part in the description which follows and, in part, will be apparent from the description, or may be learned by practice of the presented exemplary embodiments.

In a first embodiment, a step motor is provided. The step motor includes a stator that includes a plurality of stator cores. Each of the stator cores has a coil unit coiled therearound. The step motor also includes a rotor that includes a rotation shaft and a plurality of permanent magnets. The rotor is configured to rotate by magnetic interaction between the stator cores and the permanent magnets. The step motor further includes a plurality of conducting parts that are on one cross-sectional surface of the rotor. The step motor includes a printed circuit board (PCB) that includes electric elements that are arranged on the PCB and are spaced apart from the plurality of conducting parts by certain distance to face the plurality of conducting parts. The conducting parts and the electric elements electrically or magnetically interact with each other as the rotor rotates. The interaction changes electrical signals generated by the electric elements.

Each of the electric elements may include a plurality of pattern coils. The plurality of pattern coils can be arranged on one surface of the PCB and are spaced apart from each other by certain distance along a circumference of the rotation shaft. The plurality of conducting parts can be arranged on one cross-sectional surface of the rotor and are spaced apart from each other by certain distance along the circumference of the rotation shaft. An angle between neighboring pattern coils can be different from an angle between neighboring conducting parts.

The plurality of pattern coils can be arranged on one surface of the PCB and are spaced apart from each other by certain distance along a circumference of the rotation shaft. The plurality of conducting parts can include first conducting parts and second conducting parts. The first conducting parts have different thicknesses to the second conducting parts. The first conducting parts and the second conducting parts are alternately arranged on one cross-sectional surface of the rotor along the circumference of the rotation shaft.

The plurality of pattern coils can be arranged on one surface of the PCB and are spaced apart from each other by certain distance along a circumference of the rotation shaft. The plurality of conducting parts can include first conducting parts and second conducting parts. The first conducting parts are formed of different materials from the second conducting parts. The first conducting parts and the second conducting parts are alternately arranged on one cross-sectional surface of the rotor along the circumference of the rotation shaft.

The electric elements can include a plurality of capacitors. Each of the capacitors can include a first electrode, a second electrode, and an insulating layer between the first electrode and the second electrode. The first electrode and the second electrode are arranged in a longitudinal direction of the rotation shaft. The capacitor can further include a protection layer on the second electrode layer. The capacitor can include the first electrode, the second electrode, and the insulating layer between the first electrode and the second electrode. The first electrode and the second electrode are arranged along a circumference of the rotation shaft. The plurality of capacitors can be arranged on one surface of the PCB and are spaced apart from each other by certain distance along a circumference of the rotation shaft. The plurality of conducting parts can be arranged on one cross-sectional surface of the rotor and are spaced apart from each other by certain distance along the circumference of the rotation shaft.

An angle between neighboring capacitors can be different from an angle between neighboring conducting parts. The plurality of capacitors can be arranged on one surface of the PCB and are spaced apart from each other by certain distance along a circumference of the rotation shaft. The plurality of conducting parts can include first conducting parts and second conducting parts. The first conducting parts have different thicknesses from the second conducting parts. The first conducting parts and the second conducting parts are alternately arranged on one cross-sectional surface of the rotor along the circumference of the rotation shaft.

In a second embodiment, a system for driving the step motor is provided. The system includes a driving unit configured to provide a driving current to the step motor by using a standard signal corresponding to an operation mode of the step motor and electrical signals generated by electric elements. The system also includes a control unit configured to transmit the standard signal corresponding to an operation mode of the step motor and the electric signals generated by the electric elements to the driving unit.

The driving unit generates the driving current by comparing the electrical signal with the standard signal. The control unit can include an output signal generating unit configured to generate electric signals by using the electric elements. The control unit can also include a standard signal generating unit configured to generate the standard signal according to an operation mode of the step motor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
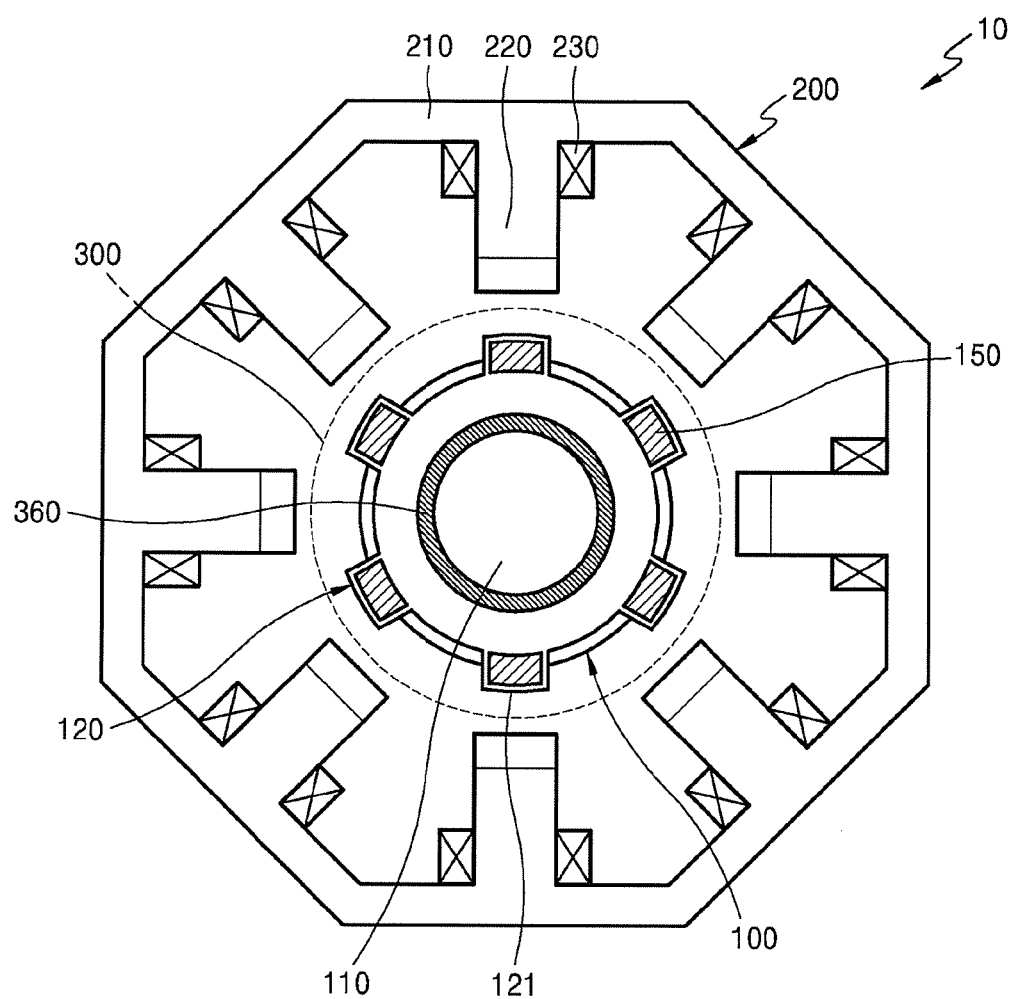
FIG. 1 is a plan view of an example step motor on a printed circuit board (PCB) according to this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged motor or system. Reference will now be made in detail to exemplary embodiments of a step motor and a system for driving a step motor, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Figure 2A:
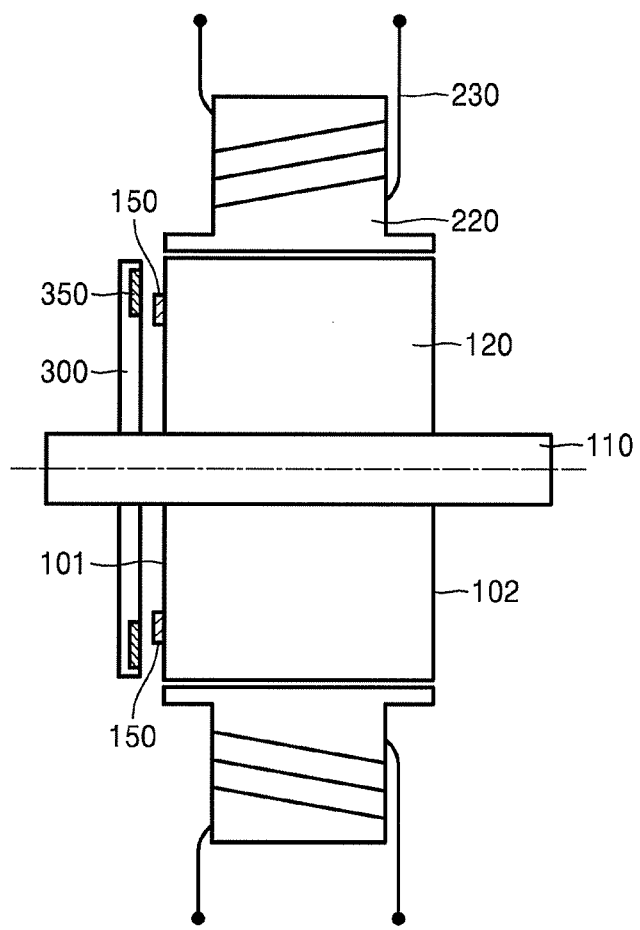
FIGS. 2A and 2B are cross-sectional views of an example step motor placed on a PCB according to this disclosure.
Figure 2B:
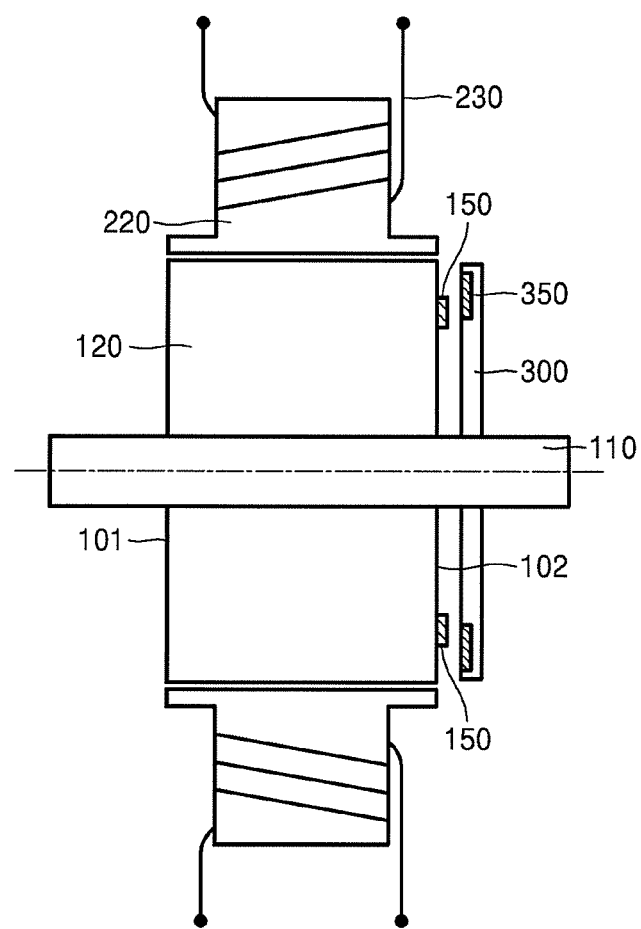

FIG. 1 illustrates an example step motor 10 according to this disclosure. FIGS. 2A and 2B illustrate cross-sectional views of an example step motor 10 according to this disclosure.

Referring to FIG. 1, the step motor 10 includes a rotor 100, a stator 200, a housing (not shown) outside the rotor 100 and the stator 200, and the PCB 300. The rotor 100 includes a rotation shaft 110 and permanent magnets 120 that are fixed on the rotation shaft 110. The permanent magnets 120 extend along a longitudinal direction of the rotation shaft 110 and are arranged so that North (N) and South (S) poles of the permanent magnets alternate along a circumference direction of the rotation shaft 110. For example, the permanent magnets 120 can be a ring-type permanent magnet that surrounds the rotation shaft 110 and includes 6 teeth 121, which are arranged along a circumference direction of the rotation shaft 110. Here, each of the 6 teeth 121 can be arranged along a circumference direction of the rotation shaft 110 so that N and S poles of the permanent magnets alternate with each other.

The stator 200 can include a yoke 210 in the housing, a plurality of stator cores 220, and a plurality of coil units 230, each of which coils around the stator core 220. The stator cores 220 are arranged at constant intervals along a circumference following an inner wall of the yoke 210. For example, the number of the stator cores 220 formed in a circumference direction along the inner wall of the yoke 210 at constant intervals may be 8. The coil units 230 respectively coil around the stator cores 220 and change a magnetic property of the stator cores 220 according to an electrical signal transmitted to each step.

The PCB 300 has a hollow form through which the rotation shaft 110 passes. The PCB 300 is positioned on the rotation shaft 110 by using a bearing member 360 disposed on a hollow part. A plurality of electric elements 350 (see FIGS. 2A and 2B) faces a surface of the rotor 100 and senses rotation of the rotor 110. For example, referring to FIGS. 2A and 2B, the electric elements 350 are arranged on the PCB 300 to face a first end 101 or a second end 102 of the rotor 100. The electric elements 350 are members that generate electrical signals that change by interacting with the rotor 100, particularly, with conducting parts 150 each disposed on one cross-sectional surface of the permanent magnet 120. Examples of the electric element 350 include a pattern coil 310 (see FIG. 3) that generates inductance or a capacitor 320 (see FIG. 7) that generates electrostatic capacitance. However, exemplary embodiments are not limited thereto, and the electric elements 350 vary depending on electrical signals that change by interacting with the conducting member 150 disposed on one cross-sectional surface of the permanent magnet 120.

Figure 3A:
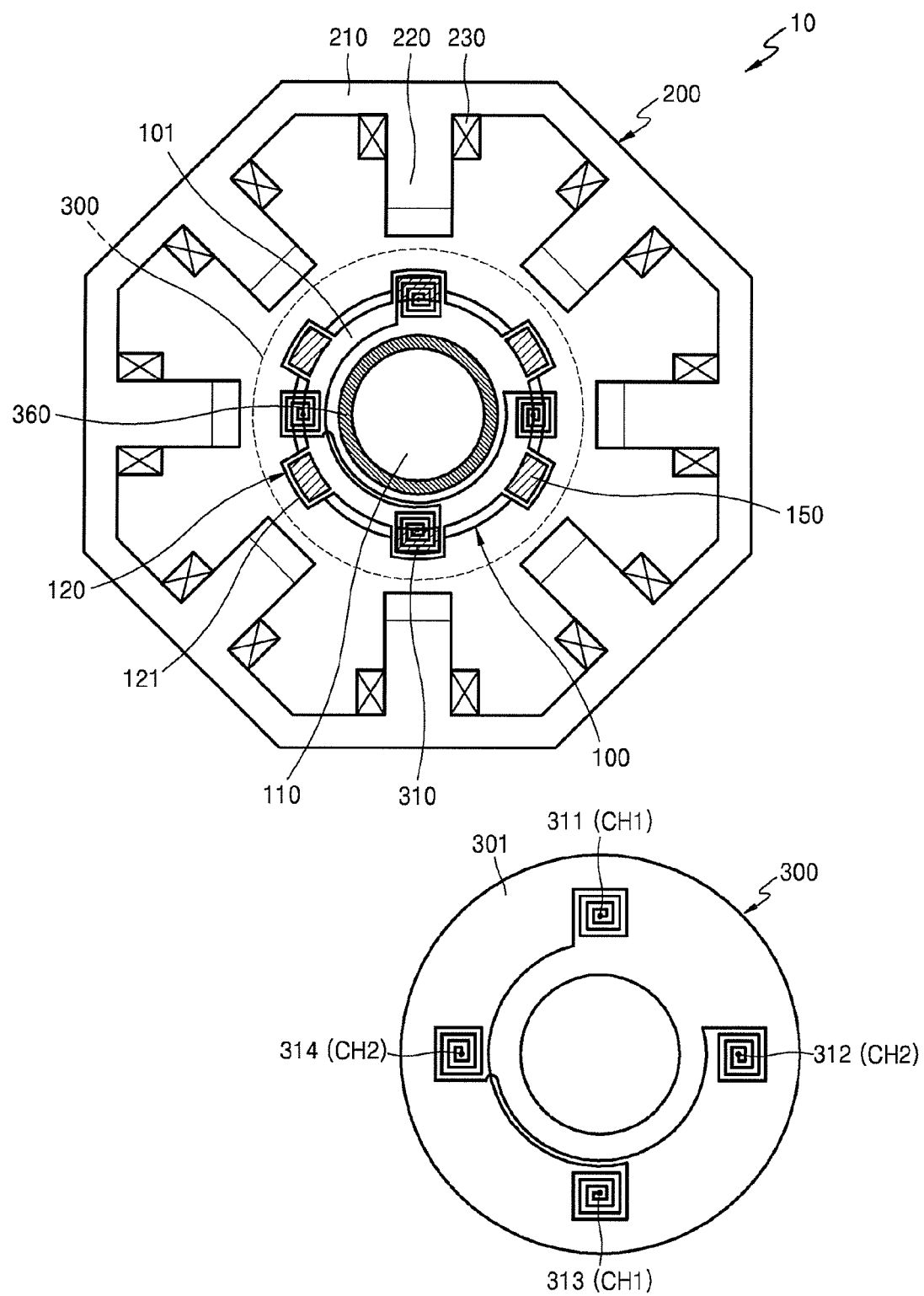
FIGS. 3A and 3B are plan views of an example step motor placed on a PCB according to this disclosure.
Figure 3B:
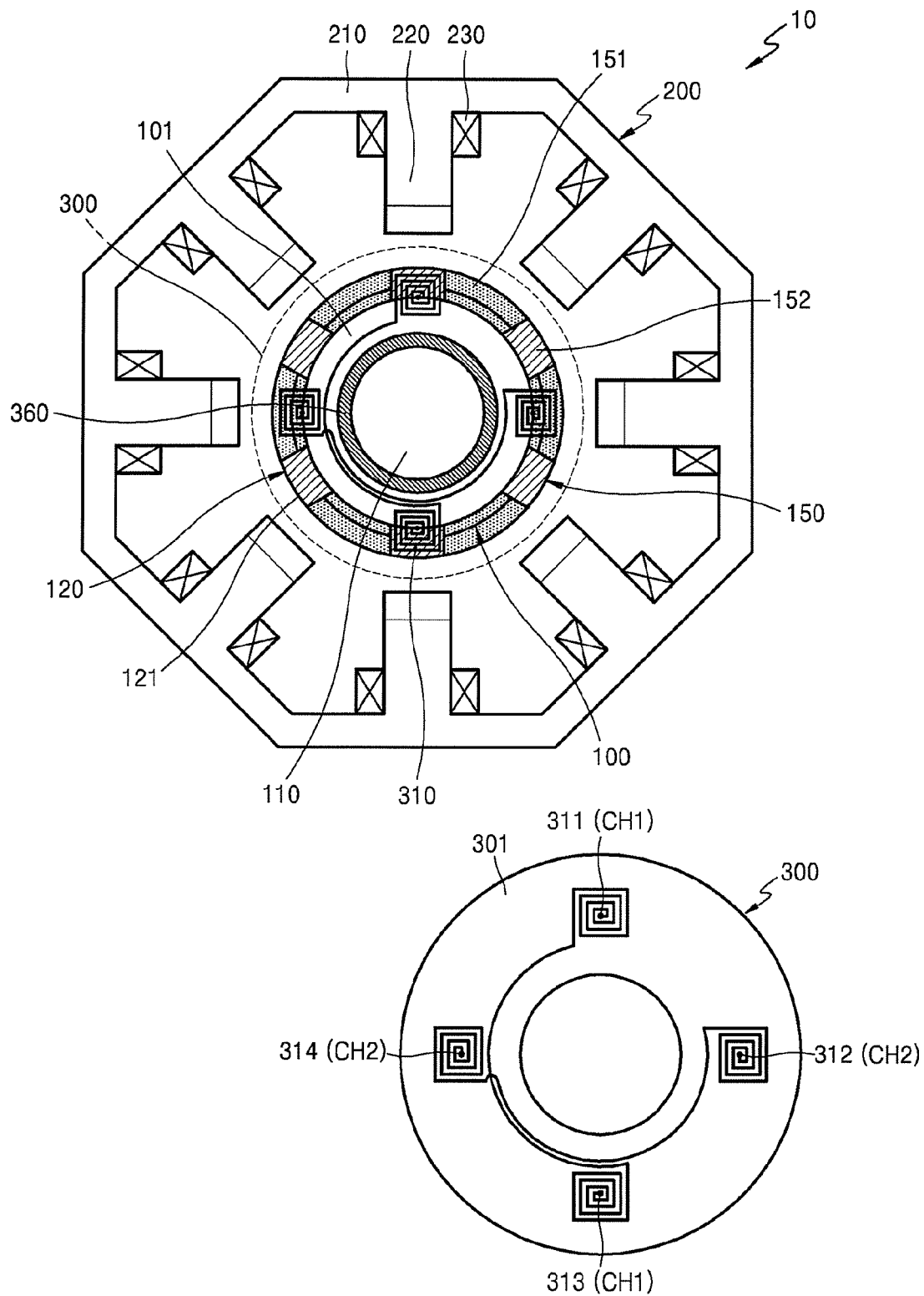
Figure 4:
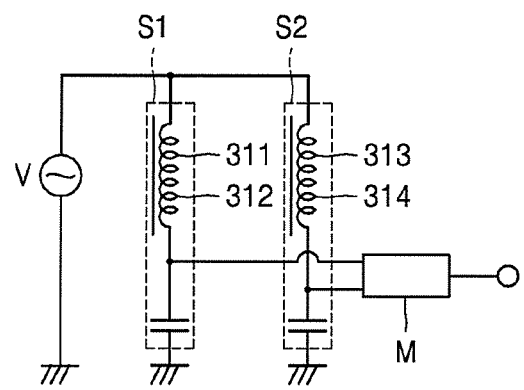
FIG. 4 is a detection circuit for detecting an inductance according to this disclosure.

FIGS. 3A and 3B illustrate an example step motor 10 according to this disclosure. FIG. 4 illustrates an example circuit arrangement according to this disclosure. Referring to FIGS. 2A, 2B and 3A, the conducting part 150 is disposed on one cross-sectional surface of the permanent magnet 120. The conducting part 150 generates eddy currents by magnetic flux that occurs when a signal current is supplied to the electric element 350, that is, the pattern coil 310. For example, the conducting part 150 is formed of a conductive material such as aluminum, iron, copper, a wiring board, a conductive film, or a plastic material containing metal. The plurality of conducting parts 150 are arranged at predetermined intervals, and thus a region for interaction with the pattern coil 310 is distinguished by the presence of the conducting parts 150. However, a region for interaction with the pattern coil 310 is distinguished by continuously arranging the plurality of conducting parts 150 that have different thicknesses or that are formed of different materials. For example, referring to FIG. 3B, first conducting parts 151 and second conducting parts 152 that are formed of different materials or have different thicknesses from each other are alternately arranged along a circumference of the rotation shaft 110.

The pattern coils 310 are arranged on a substrate 301 of the PCB 300 and, for example, include first to fourth pattern coils 311, 312, 313, 314 having a square spiral form. The pattern coils 310 face the conducting parts 150. For example, each of the first to fourth pattern coils 311, 312, 313, 314 is arranged at an angular interval of 90 degrees. That is, the first pattern coil 311, the second pattern coil 312, the third pattern coil 313, and the fourth pattern coil 314 are arranged at an angular interval of 90 degrees in the stated order. Also, the first pattern coil 311 and the third pattern coil 313 form an offset of 180 degrees which construct a first channel CH1, and the second pattern coil 312 and the fourth pattern coil 314 form an offset of 180 degrees which construct a second channel CH2. Here, the first pattern coil 311 and the second pattern coil 312 form a first system S1, and the third pattern coil 313 and the fourth pattern coil 314 form a second system S2. A circuit is designed to obtain detection signals from each of the first and second systems S1 and S2.

According to an exemplary embodiment, a principle for detecting a rotation angle of the rotor 100 is schematically described herein. Referring to FIG. 4, the first and second systems S1 and S2, respectively, are connected to an AC voltage source V in parallel to apply a voltage to a resonance circuit of the first and second systems S1 and S2, and thus magnetic flux is generated at the first to fourth pattern coils 311, 312, 313, 314. Here, when the conducting parts 150 face the first to fourth pattern coils 311, 312, 313, 314, respectively, eddy currents are generated at the conducting parts 150, and magnetic flux passing the first to fourth pattern coils 311, 312, 313, 314 decreases due to the eddy currents generated at the conducting parts 150. As the magnetic flux changes in correspondence to the eddy currents generated at the conducting parts 150, an amount of inductance of the first to fourth pattern coils 311, 312, 313, 314 changes.

When the rotor 100 rotates about the rotation shaft 110 as a center, the conducing parts 150 periodically face the first to fourth pattern coils 311, 312, 313, 314. Alternatively, the first conducing parts 151 and the second conducting parts 152 that are formed at different heights or are formed of different materials from each other periodically face the first to fourth pattern coils 311, 312, 313, 314. In this regard, when a magnetic flux is generated from the first to fourth pattern coils 311, 312, 313, 314, an amount of inductance also periodically changes.

Since amplitudes, phases, or frequencies of output signals obtained from the first and second systems S1 and S2, respectively, that are formed of the first to fourth pattern coils 311, 312, 313, 314 change due to a change in the amount of the inductance of the first to fourth pattern coils 311, 312, 313, 314, a rotation angle of the rotor 100 is detected by sensing the change of the amplitudes, phases, or frequencies. For example, a phase comparing device M is connected to the first and second systems S1 and S2, respectively, at nodes of the resonance circuit, and a rotation angle and a rotation direction of the rotor 100 are detected by detecting and comparing output signals by using phases of the inductances of the first and second systems S1 and S2, respectively, from the phase comparing device M.

Figure 5:
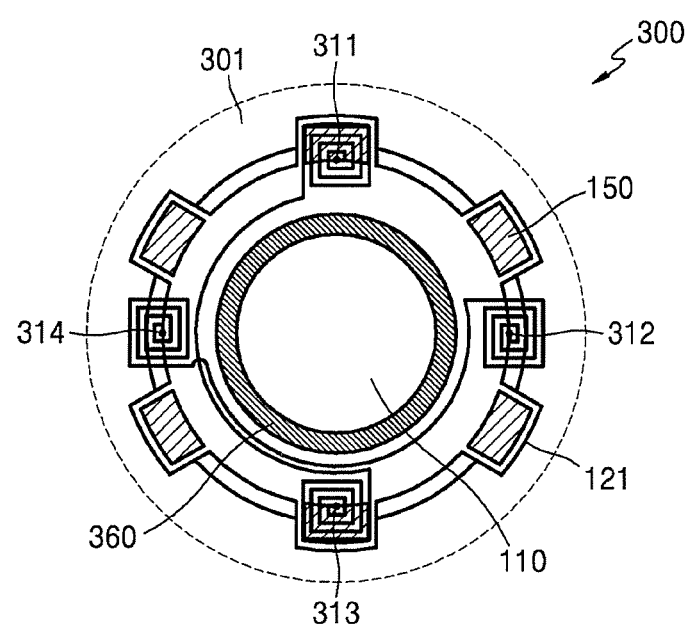
FIG. 5 is a plan view of an example step motor on a PCB including a coil unit placed on the PCB according to this disclosure.
Figure 6:
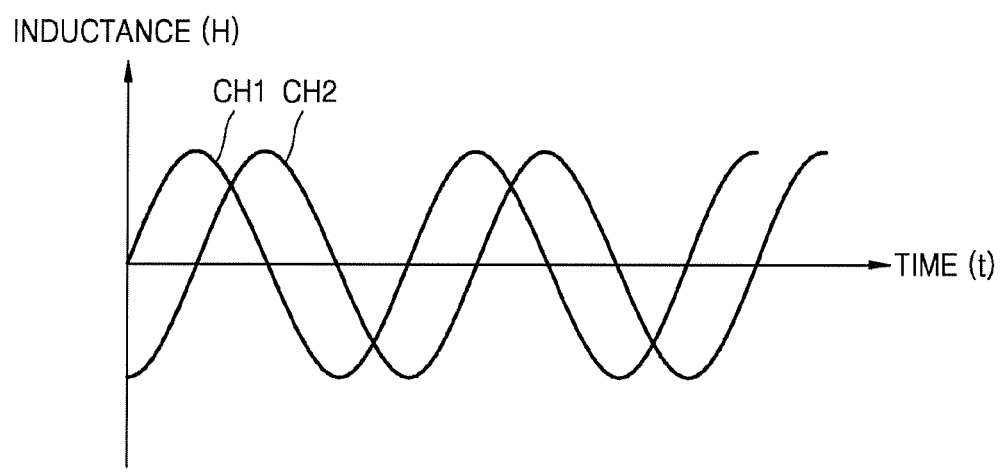
FIG. 6 is a graph illustrating an example of a change in the inductance generated in a coil unit according to this disclosure.

For example, referring to FIGS. 5 and 6, the first pattern coil 311 and the second pattern coil 312 that are neighboring each other and the third pattern coil 313 and the fourth pattern coil 314 that are neighboring each other are spaced apart at an angular interval of 90 degrees, and thus sine waves having a phase difference of 90 degrees are detected. Here, when the neighboring conducting parts 150 are spaced apart at an angular interval of 60 degrees, the first channel CH1 and the second channel CH2 detect output signals having different amount of inductances at the same time. In this case, the first channel CH1 and the second channel CH2 analyze different output signals, and thus a rotation direction as well as a rotation angle of the rotor 100 are detected. For example, depending on which output signal of the first channel CH1 and the second channel CH2 precedes the other, a rotation direction of the rotor 100 is sensed as a clockwise direction or a counter-clockwise direction.

Figure 7A:
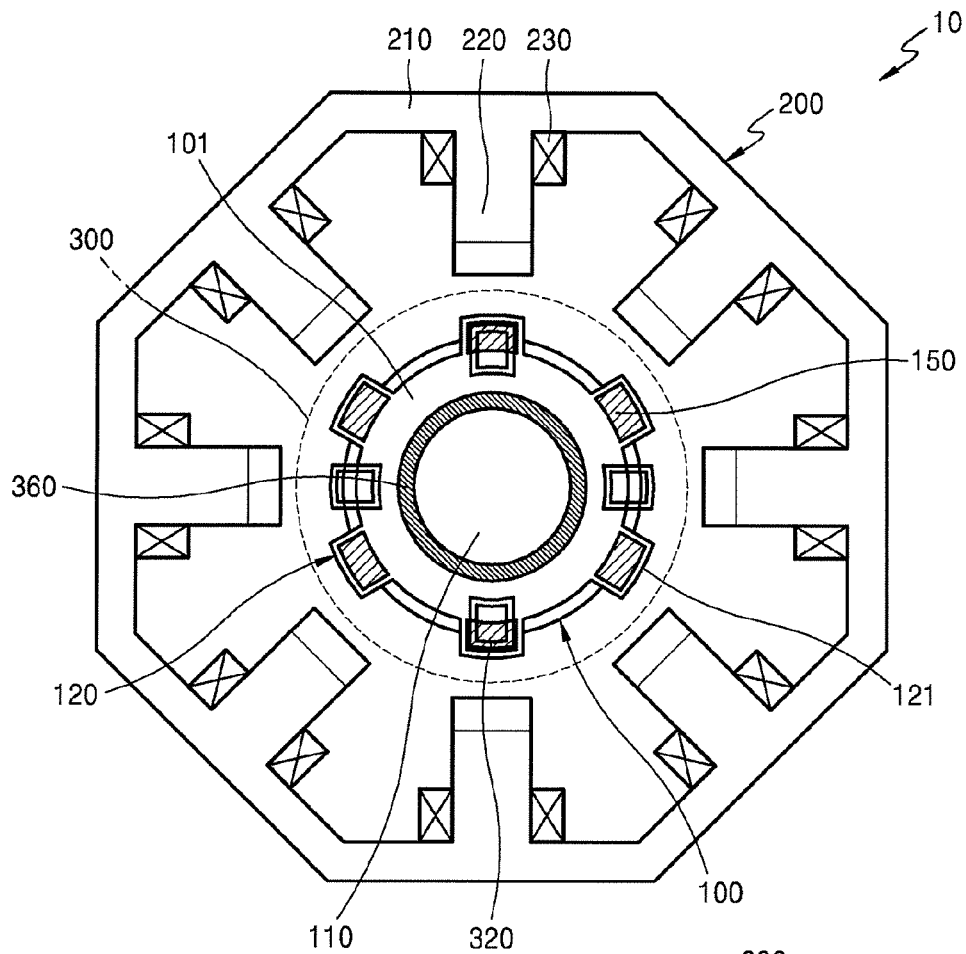
FIGS. 7A and 7B are plan views of an example step motor on a PCB according to this disclosure.
Figure 7A:
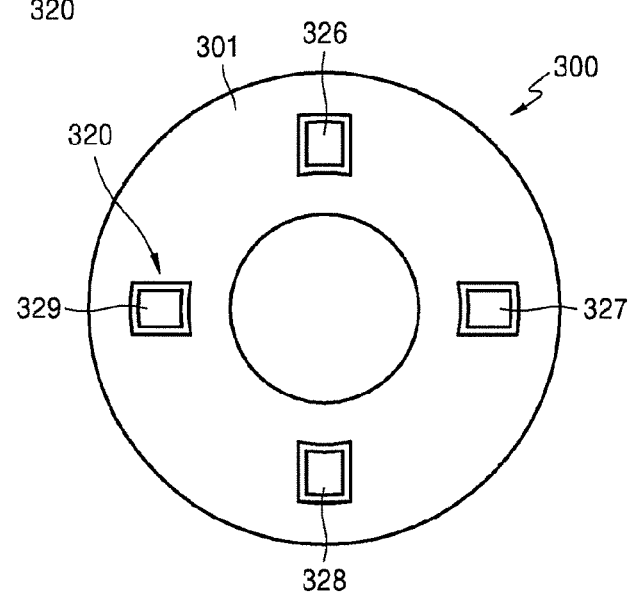
Figure 7B:
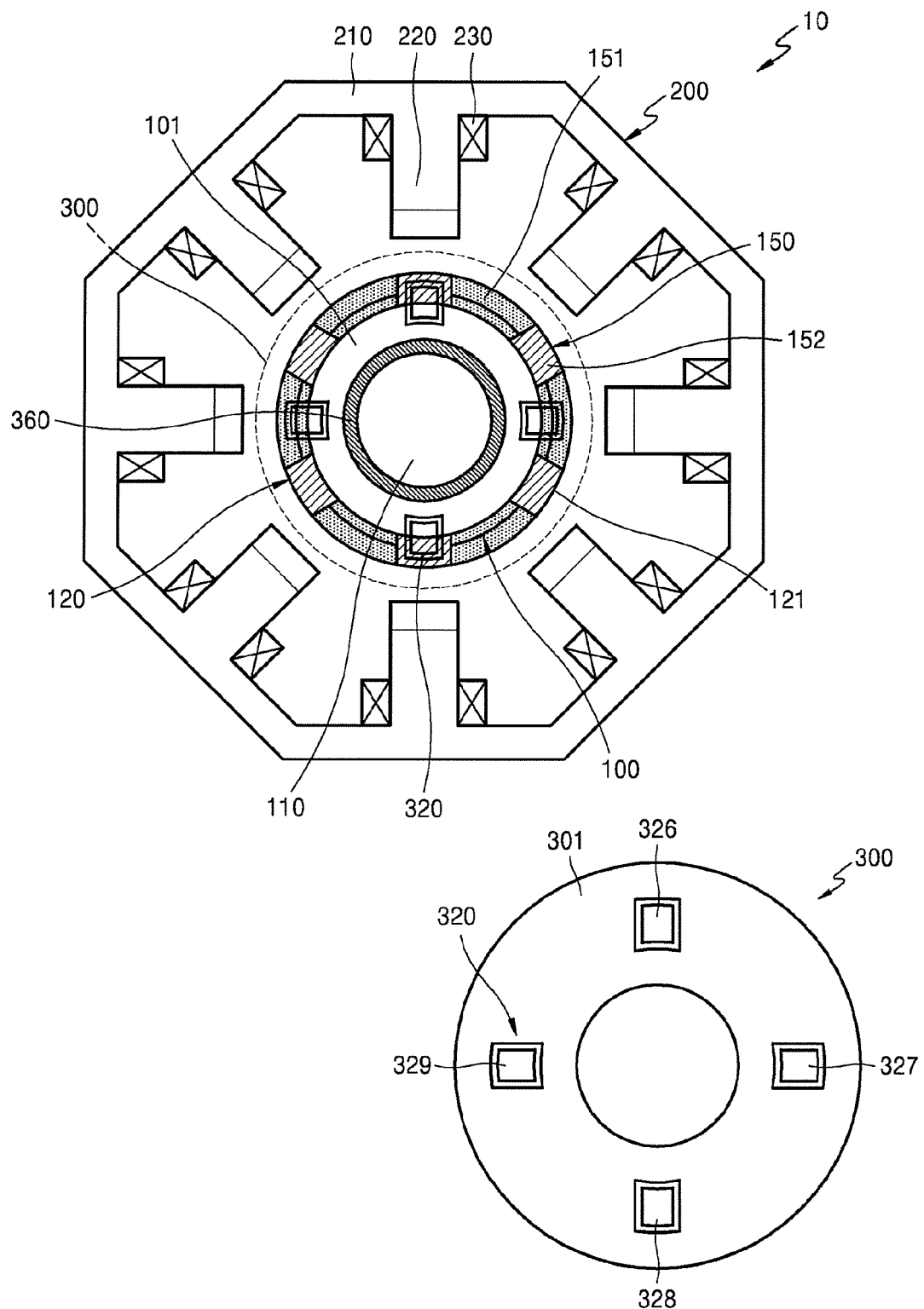

FIGS. 7A and 7B show an example step motor 10 according to this disclosure. FIGS. 8A to 9B illustrate an example structure of a capacitor 320 according to this disclosure. Referring to FIG. 7A, the conducting part 150 is disposed on one cross-sectional surface of the permanent magnetic 120. The conducting part 150 changes an electrostatic capacitance of the capacitor 320 by interacting with the electric element 350, that is, the capacitor 320. For example, the conducting part 150 is formed of a conductive material such as aluminum, iron, copper, a wiring board, a conductive film, or a plastic material containing metal. The plurality of conducting parts 150 are arranged at certain intervals, and thus a region for interaction with the capacitor 320 is distinguished by the presence of the conducting parts 150. However, a region for interaction with the capacitor 320 is distinguished by continuously arranging the plurality of conducting parts 150 that have different thicknesses. For example, referring to FIG. 7B, first conducting parts 151 and second conducting parts 152 that have different thicknesses from each other are alternately arranged along a circumference of the rotation shaft 110.

A plurality of the capacitors 320 are arranged on the PCB 300, and the capacitors 320 are disposed to face the conducting parts on one cross-sectional surface of a teeth part 121. When the rotor 100 rotates, the conducting parts 150 periodically face the capacitors 320, or the first conducting parts 151 and the second conducting parts 152 that have different thicknesses periodically face the capacitors 320, and thus an electrostatic capacitance of the capacitors 320 changes periodically.

A technique for measuring an electrostatic capacitance of the capacitors 320 is determined depending on the arrangement of arranging the first electrode 321 and the second electrode 322. For example, referring to FIGS. 7 and 8A, when the first electrode 321 is disposed on the base substrate 323 and the second electrode 322 is disposed to face the first electrode 321 at a constant interval, an electrostatic capacitance of the capacitor 321 is measured by a self-electrostatic capacitance technique.

The first electrode 321 and the second electrode 322 are formed of a conductive material. Examples of the conductive material include an indium tin oxide, a tin oxide, an indium zinc oxide, an indium tin zinc oxide, a metallic single-walled carbon nanotube (SWCNT), and a conductive polymer poly 3,4-ethylenedioxythiophene (PEDOT). The first electrode 321 and the second electrode 322 face each other and thus are prepared in various shapes, of which coordinate information of an external input is measured. For example, the first electrode 321 and the second electrode 322 have a flat pattern shape including a continuous pattern of rhombuses or diamonds.

The insulating layer 324 is disposed between the first electrode 321 and the second electrode 322. The insulating layer 324 insulates the first electrode 321 and the second electrode 322 so as not to contact each other. Also, the insulating layer 324 serves as a dielectric layer between the first electrode 321 and the second electrode 322. The insulating layer 324 is formed by filling a space between the first electrode 321 and the second electrode 322 with an insulating material.

The protection layer 325 is disposed on the second electrode 322. The protection layer 325 protects the second electrode 322 from the outside, and, in some embodiments, the protection layer 325 is omitted.

Figure 8A:
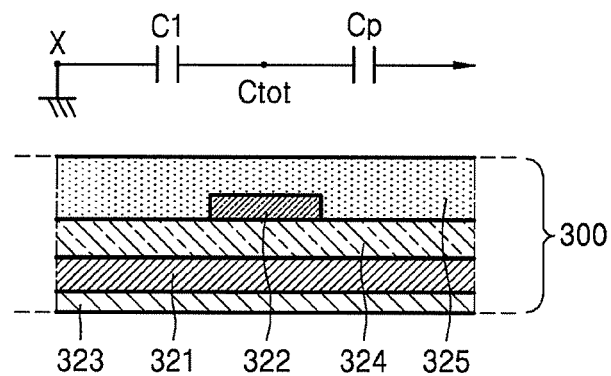
FIGS. 8A and 8B are partial cross-sectional views of an example self-electrostatic capacitance type capacitor for measuring an electrostatic capacitance according to this disclosure.
Figure 8B:
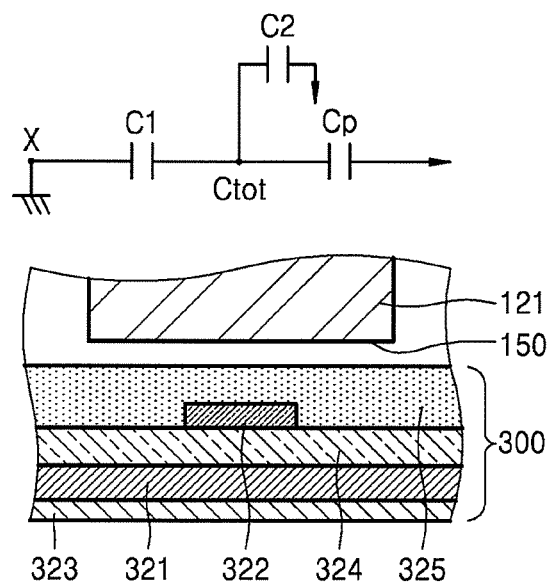

The schematic principle of detecting a rotation angle of the rotor 100 by the self-electrostatic capacitance technique according to another embodiment is as follows. In FIGS. 8A and 8B, the first electrode 321 is defined by an X-axis electrode X, and the second electrode 322 is defined by a Y-axis electrode Y. The X-axis electrode X is grounded and becomes a reference voltage unit having a voltage of 0 V. The Y-axis electrodes Y become a measuring unit that measures a voltage or an electrostatic capacitance. Referring to FIGS. 8A and 8B, when the rotor 100 rotates and the conducting parts 150 disposed at a first end part 101 and a second end part 102 face the second electrode 322, the conducting part 150 becomes a new conducting plate. In this regard, a new capacitor is formed in the protection layer 325 that is disposed between the conducting part 150 and the second electrode 322, and thus a second electrostatic capacitance C2 is formed. Also, although not shown in FIGS. 8A and 8B, the capacitor 320 according to an embodiment has a parasitic electrostatic capacitance C9 that is formed of various electrostatic capacitances generated between the first electrode 321 and the second electrode 322. Thus, with reference to the measuring unit, the Y-axis electrode Y, a first electrostatic capacitance C1 between the first electrode 321 and the second electrode 322, the parasitic electrostatic capacitance Cp, and a second electrostatic capacitance C2 caused by the conducting part 150 are connected in parallel.

When the electrostatic capacitances C1, C2, Cp are in parallel, an electrostatic capacitance Ctot value measured at the Y-axis electrode Y is obtained by the sum of the electrostatic capacitances C1, C2, Cp. Thus, when the rotor 100 rotates with the rotation shaft 110 in the center, the conducting parts 150 facing the capacitors 320 change periodically, and thus a size of the electrostatic capacitance Ctot measured at the Y-axis electrode Y also changes periodically.

An output signal, an amplitude, a phase, or a frequency changes due to change in a size of the electrostatic capacitance Ctot measured at the Y-axis electrode Y, and thus a rotation angle and a rotation direction of the rotor 100 is detected by sensing the change in an amplitude, a phase, or a frequency.

Figure 9A:
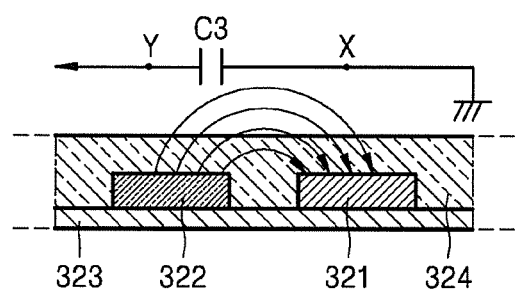
FIGS. 9A and 9B are partial cross-sectional views of an example mutual electrostatic capacitance type capacitor for measuring an electrostatic capacitance according to this disclosure.

Referring to FIGS. 7 and 9A, for example, the first electrode 321 and the second electrode 322 are disposed side by side at a certain interval, and an electrostatic capacitor of the capacitor 320 is measured by the self-electrostatic capacitance technique when the first electrode 321 and the second electrode 322 are arranged as described herein.

Figure 9B:
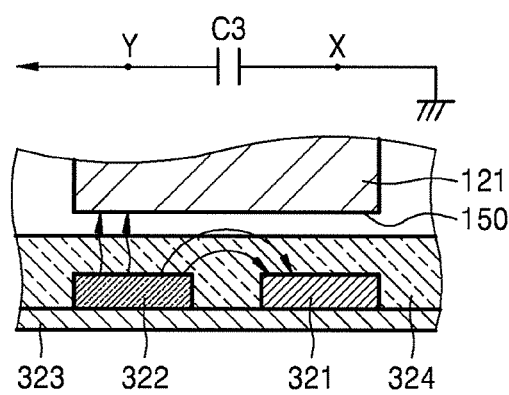
Figure 10:
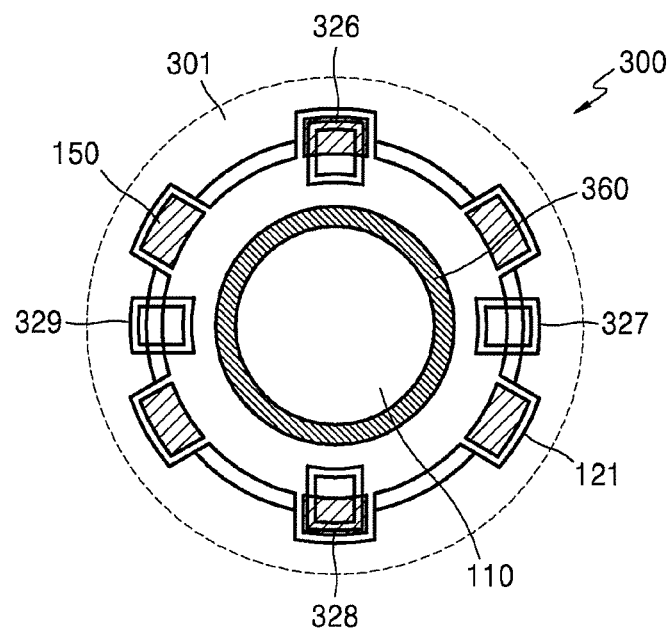
FIG. 10 is a plan view of an example step motor on a PCB including a capacitor placed on the PCB according to this disclosure.

In FIGS. 9A and 9B, the first electrode 321 is defined by an X-axis electrode X, and the second electrode 322 is defined by a Y-axis electrode Y. The X-axis electrode X is grounded and becomes a reference voltage unit having a voltage of 0 V. The Y-axis electrodes Y become a measuring unit that measures a voltage or an electrostatic capacitance. Referring to FIGS. 9A and 9B, when the rotor 100 rotates and the conducting parts 150 disposed at a first end part 101 and a second end part 102 face the first electrode 321 and the second electrode 322, the conducting part 150 becomes a new conducting plate. In this regard, an electric field is formed between the conducting part 150 and the second electrode 322, and an electrostatic capacitance C3 measured at the Y-axis electrode Y changes.

Therefore, when the rotor 100 rotates with the rotation shaft 110 in the center, the conducting parts 150 facing the capacitors 320 change periodically, and thus a size of the electrostatic capacitance C3 measured at the Y-axis electrode Y also changes periodically. An amplitude, a phase, or a frequency of an output signal changes due to change in a size of the electrostatic capacitance C3 measured at the Y-axis electrode Y, and thus a rotation angle and a rotation direction of the rotor 100 is detected by sensing the change in an amplitude, a phase, or a frequency According to an exemplary embodiment, output signals that are detected by an electrostatic capacitance differ depending on an arrangement of the capacitors 326, 327, 328, 329, which are used as electric elements 350. For example, referring to FIG. 10, when an interval between a first capacitor 326 and a second capacitor 327 or between a third capacitor 328 and a fourth capacitor 329 that are neighboring each other is different from an interval between the neighboring conducting parts 150 of the rotor 100, output signals different from each other are detected at a plurality of channels, and a rotation angle as well as a rotation direction of the rotor 100 are detected by analyzing the output signals. Detailed description of the embodiment is the same with that of an exemplary embodiment and thus is omitted.

In the step motor 10 and the step motor driving system 1 according to an embodiment, a rotation angle and a rotation direction of the step motor 10 are sensed by using the electric elements 350 disposed on the PCB 300, and thus the step motor 10 is miniaturized, and a manufacturing cost of the whole system is reduced.

Figure 11:
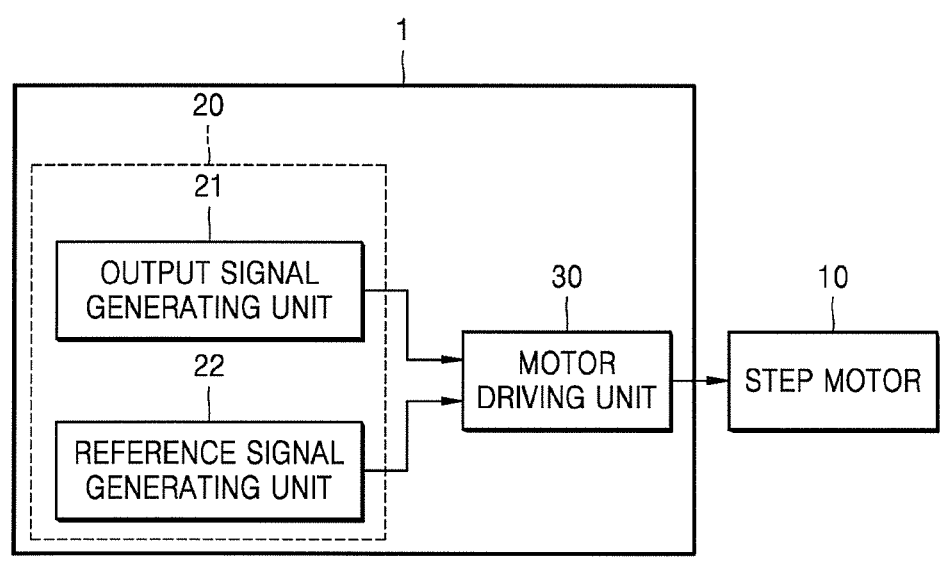
FIG. 11 is a block diagram illustrating a schematic structure of an example system for driving the step motor according to this disclosure.

FIG. 11 is a block diagram illustrating a schematic structure of an example system for driving the step motor driving system 1 according to this disclosure.

Referring to FIG. 11, the step motor driving system 1 drives the step motor 10 and includes a control unit 20 and a motor driving unit 30. The control unit 20 generates a reference signal that corresponds to a driving mode of the step motor 10 and output signals generated by the electric elements 350, and the signals are provided to the motor driving unit 30. For example, in the control unit 20, a reference signal for optimum control with respect to torque and vibration characteristics of the step motor 10 is certain, and output signals are determined by electric signals of the electric elements 350 of the step motor 10. In this regard, the control unit 20 according to an embodiment includes an output signal generating unit 21 and a reference signal generating unit 22.

The output signal generating unit 21 generates output signals of a clock type that express whether the step motor 10 operates or not and a rate of the step motor 10 by using an electric signal generated by the electric element 350 and provides the output signals to the motor driving unit 30.

The reference signal generating unit 22 generates reference signals of an appropriate intensity based on torque and vibration characteristics corresponding to the driving mode of the step motor 10 and then provide the reference signals to the motor driving unit 30. For example, the control unit 20 includes a certain memory and stores data that correspond to the driving mode of the step motor 10.

The motor driving unit 30 supplies a driving current to the step motor 10 and drives the step motor 10. Whether the step motor 10 operates or not and a rate of the operation is determined according to an amount of the driving current. For example, the motor driving unit 30 supplies the driving current to the step motor 10 by using the output signal input from the output signal generating unit 21 and the reference signal input from the reference signal generating unit 22. For example, the motor driving unit 30 drives the step motor 10 by supplying a driving current, of which a position error is compensated based on difference in two signals, to the step motor 10 by receiving the output signal input from the output signal generating unit 21 and the reference signal input from the reference signal generating unit 22.

The step motor 10 and the step motor driving system 1 compensates the position error by sensing the position error and a rotation direction of the step motor 10 by using electric elements disposed on a PCB. Therefore, a rotation sensor-type step motor system including a microscopic magnetic sensor or an optical sensor is disposed on the PCB is easily manufactured, and a size of the whole step motor system is miniaturized, and a manufacturing cost of the step motor system is reduced.

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A step motor comprising:
   a stator that comprises a plurality of stator cores, wherein each of the stator cores has a coil unit coiled therearound;
   a rotor that comprises a rotation shaft and a plurality of permanent magnets and is configured to rotate by magnetic interaction between the stator cores and the permanent magnets;
   a plurality of conducting parts that are on one cross-sectional surface of the rotor; and
   a printed circuit board (PCB) that comprises electric elements that are arranged on the PCB and are spaced apart from the plurality of conducting parts by a certain distance to face the plurality of conducting parts, wherein the plurality of conducting parts and the electric elements are configured to electrically or magnetically interact with each other as the rotor rotates, and wherein the magnetic interaction changes electrical signals generated by the electric elements,
   wherein each of the electric elements comprises a plurality of pattern coils and wherein the plurality of pattern coils are arranged on one surface of the PCB and are spaced apart from each other by the certain distance along a circumference of the rotation shaft, wherein the plurality of conducting parts comprise first conducting parts and second conducting parts, wherein the first conducting parts have different thicknesses to the second conducting parts, and wherein the first conducting parts and the second conducting parts are alternatively arranged on one cross-sectional surface of the rotor along the circumference of the rotation shaft.

2. The step motor of claim 1, wherein the plurality of pattern coils are arranged on one surface of the PCB and are spaced apart from each other by the certain distance along a circumference of the rotation shaft, and wherein the plurality of conducting parts are arranged on one cross-sectional surface of the rotor and are spaced apart from each other by the certain distance along the circumference of the rotation shaft.

3. The step motor of claim 2, wherein an angle between neighboring pattern coils is different from an angle between neighboring conducting parts.

4. A system for driving the step motor of claim 1, the system comprising:
a driving unit configured to provide a driving current to the step motor by using a standard signal corresponding to an operation mode of the step motor and electrical signals generated by electric elements; and
a control unit configured to transmit the standard signal corresponding to the operation mode of the step motor and the electric signals generated by the electric elements to the driving unit.

5. The system of claim 4, wherein the driving unit is configured to generate the driving current by comparing an electrical signal with the standard signal.

6. The system of claim 4, wherein the control unit comprises:
an output signal generating unit configured to generate the electric signals by using the electric elements; and
a standard signal generating unit configured to generate the standard signal according to the operation mode of the step motor.

7. A step motor comprising:
a stator that comprises a plurality of stator cores, wherein each of the stator cores has a coil unit coiled therearound;
a rotor that comprises a rotation shaft and a plurality of permanent magnets and is configured to rotate by magnetic interaction between the stator cores and the permanent magnets;
a plurality of conducting parts that are on one cross-sectional surface of the rotor; and
a printed circuit board (PCB) that comprises electric elements that are arranged on the PCB and are spaced apart from the plurality of conducting parts by a certain distance to face the plurality of conducting parts, wherein the plurality of conducting parts and the electric elements are configured to electrically or magnetically interact with each other as the rotor rotates, and wherein the magnetic interaction changes electric signals generated by the electric elements, wherein each of the electric elements comprises a plurality of pattern coils, and wherein the plurality of pattern coils are arranged on one surface of the PCB at certain intervals along a circumference of the rotation shaft, wherein the plurality of conducting parts comprise first conducting parts and second conducting parts, wherein the first conducting parts are formed of different materials from the second conducting parts, and wherein the first conducting parts and the second conducting parts are alternately arranged on one cross-sectional surface of the rotor along the circumference of the rotation shaft.

8. A step motor comprising:
a stator that comprises a plurality of stator cores, wherein each of the stator cores has a coil unit coiled therearound;
a rotor that comprises a rotation shaft and a plurality of permanent magnets and is configured to rotate by magnetic interaction between the stator cores and the permanent magnets;
a plurality of conducting parts that are on one cross-sectional surface of the rotor; and
a printed circuit board (PCB) that comprises electric elements that are arranged on the PCB and are spaced apart from the plurality of conducting parts by a certain distance to face the plurality of conducting parts, wherein the plurality of conducting parts and the electric elements are configured to electrically or magnetically interact with each other as the rotor rotates, and wherein the magnetic interaction changes electrical signals generated by the electric elements, wherein the electric elements comprise a plurality of capacitors and the plurality of capacitors are arranged on one surface of the PCB and are spaced apart from each other by the certain distance along a circumference of the rotation shaft, wherein the plurality of conducting parts comprise first conducting part and second conducting parts, wherein the first conducting parts have different thicknesses to the second conducting parts, and wherein the first conducting parts and the second conducting parts are alternatively arranged on one cross-sectional surface of the rotor along the circumference of the rotation shaft.

9. The step motor of claim 8, wherein each of the capacitors comprises:
a first electrode;
a second electrode; and
an insulating layer between the first electrode and the second electrode, wherein the first electrode and the second electrode are arranged in a longitudinal direction of the rotation shaft.

10. The step motor of claim 9, wherein the capacitor further comprises a protection layer on a second electrode layer.

11. The step motor of claim 8, wherein a capacitor comprises a first electrode, a second electrode, and an insulating layer between the first electrode and the second electrode, wherein the first electrode and the second electrode are arranged along a circumference of the rotation shaft.

12. The step motor of claim 8, wherein the plurality of capacitors are arranged on one surface of the PCB and are spaced apart from each other by the certain distance along a circumference of the rotation shaft, and wherein the plurality of conducting parts are arranged on one cross-sectional surface of the rotor at certain positions along the circumference of the rotation shaft.

13. The step motor of claim 12, wherein an angle between neighboring capacitors is different from an angle between neighboring conducting parts.

* * * * *